United States Patent [19]

Noorlander

[11] 4,352,234
[45] Oct. 5, 1982

[54] METHOD OF MAKING INFLATION FOR TEAT CUP ASSEMBLY

[76] Inventor: Daniel O. Noorlander, 508 W. 630 South, Orem, Utah 84057

[21] Appl. No.: 223,706

[22] Filed: Jan. 9, 1981

Related U.S. Application Data

[62] Division of Ser. No. 36,562, May 7, 1979, Pat. No. 4,280,446.

[51] Int. Cl.³ .............................................. B23P 11/02
[52] U.S. Cl. ....................................... 29/450; 29/458; 156/294
[58] Field of Search ........................ 29/235, 451, 458; 156/29.4; 119/14.49, 14.47, 14.52

[56] References Cited

U.S. PATENT DOCUMENTS

| 1,201,808 | 10/1916 | Dinesen | 119/14.49 |
| 1,476,788 | 12/1923 | Anderson | 119/14.49 |
| 1,600,231 | 9/1926 | Hulbert | 29/235 |
| 1,648,436 | 11/1927 | Allen | 29/235 |
| 1,700,025 | 1/1929 | Cockburn | 119/14.49 |
| 2,219,945 | 10/1940 | Scott | 119/14.49 X |
| 2,997,980 | 8/1961 | Noorlander | 119/14.49 X |
| 3,281,927 | 11/1966 | Buslaff | 29/235 |
| 3,659,557 | 5/1972 | Noorlander | 119/14.47 X |
| 4,116,165 | 9/1978 | Arrington | 119/14.49 X |

FOREIGN PATENT DOCUMENTS

117307 7/1918 United Kingdom ............. 119/14.49

Primary Examiner—Charlie T. Moon
Attorney, Agent, or Firm—Terry M. Crellin; B. Deon Criddle

[57] ABSTRACT

An inflation for use in a teat cup assembly for automatic milking machines employing a vacuum milk line and a pulsating vacuum line is disclosed. The inflation comprises an elongate, tubular, body member having a novel mouth-forming diaphragm at one end thereof for engaging the teat of a cow to retain the teat cup assembly from falling off the teat at the end point of milking. The mouth-forming diaphragm is formed by bonding one end of a relatively short tubular mouth-forming member to one end of the body member, wherein the mouth-forming member has a maximum cross-sectional dimension smaller than the maximum cross-sectional dimension of the tubular body member. The end of the body member to which the mouth-forming member is attached is expanded over the outer circumference of an annular expansion ring which has a diameter substantially greater than the cross-sectional dimension of the unexpanded portion of the tubular body member, so that the end of the body member is held in an enlarged circular configuration and the end of the mouth-forming member which is bonded to the body member is expanded outwardly toward the perimeter of the expansion ring. The other end of the mouth-forming member extends inwardly toward the longitudinal axis of the body-forming member, thereby forming the mouth-forming diaphragm at the end of the body-forming member. The mouth-forming diaphragm has a central opening therein which has a diameter less than the maximum cross-sectional dimension of the unexpanded portion of the body-forming member. Preferably, the body member and the mouth-forming member are made of silicone rubber material, with the mouth-forming member having a circular cross-sectional shape.

14 Claims, 18 Drawing Figures

Fig. 16 ary out of $2,234

METHOD OF MAKING INFLATION FOR TEAT CUP ASSEMBLY

This is a divisional of application Ser. No. 36,562 filed on May 7, 1979, now U.S. Pat. No. 4,280,446, issued July 28, 1981.

BACKGROUND OF THE INVENTION

1. Field

The invention relates to improved teat cup inflations used in vacuum operated, automatic milking machines and to methods of forming such inflations.

2. State of the Art

Conventional automatic milking machines utilize teat cup assemblies including a hollow, rigid outer shell or cup having a part which is adapted to be attached to a pulsating vacuum line, and a resilient, tubular liner or inflation extending longitudinally of the shell or cup. The ends of the inflation make sealing engagement with the shell to form an annular vacuum chamber between the shell and the inflation. The pressure in the annular chamber is alternated between subatmospheric pressure and a higher pressure, typically atmospheric, by the pulsating vacuum line attached to the shell. A constant vacuum line is connected to the lower end of the inflation to draw milk from the cow's teat which is received in the upper end of the inflation. The interior of the inflation is, thus, maintained at a constant subatmospheric pressure, and the alternating pressure in the annular chamber periodically forces the walls of the inflation inwardly resulting in a massaging action on the teat as well as collapsing the walls of the inflation below the teat which periodically relieves the teat from exposure to the vacuum in the constant vacuum line.

It is important that the upper portion of the inflation grips the teat firmly to prevent vacuum loss and disengagement of the teat cup from the teat, as well as to prevent the teat cups from moving higher up on the teats during the pulsations of the milking machine, which can ultimately result in constriction of the teat and premature shut off of milk from the udder even though the udder is only partially emptied. The teats of different cows vary considerably in their diameter and length. Changes in teat sizes also occur during the milking. These variations and changes make it very difficult to produce teat cups which can be used in milking a number of cows. In my prior U.S. Pat. No. 3,308,788, there is disclosed a teat cup assembly in which a resilient disk element is mounted on top of the teat cup in position to engage the cow's teat and resiliently retain the cup from falling off the teat. Unfortunately, the teat cup assembly was relatively expensive both to manufacture and to maintain because of the number of individual components in the assembly. In other of my prior art patents, i.e., U.S. Pat. Nos. 3,659,557 and 3,096,740, teat cup assemblies are provided in which the inflation is molded so as to incorporate a diaphragm and an elastic means, respectively, integrally therein. Other inflations which are molded so as to incorporate a resilient retaining element integrally therein are disclosed in U.S. Pat. Nos. 2,744,496; 3,771,494; and 3,973,521. Such molded constructions are again relatively expensive.

OBJECTIVES

A principle objective of the present invention is to provide an improvement in teat cup inflations and manufacture thereof. A particular objective is to provide an inflation and method of making same for use in a teat cup assembly of an automatic milking machine, wherein the inflation is formed by joining at least two pieces of tubular, extruded elastomeric materials having different cross-sectional dimensions, with the tubular piece having the smaller, cross-sectional dimension being formed into a flexible mouth-forming diaphragm at one end of the tubular piece having the larger cross-sectional dimension, with the diaphragm having, a central opening therein which is smaller in diameter than the maximum cross-sectional, inside dimension of the larger tubular piece. Another objective is to provide an inflation and method of making same wherein the inflation is made of extruded tubular sections of silicone rubber, which is not subject to deterioration due to soil, fat, ozone, etc., and which has been found to have a much greater life than molded rubber inflations. A further objective is to provide an inflation having a novel mouth portion which maintains sufficient contact with the teat of the cow so as to prevent the teat cup assembly from dropping off the teat, but still sufficiently flexible to be used on teats of various sizes to improve milking efficiency and reduce tissue damage and mastitis. Another objective is to provide a reasonably low cost, long life inflation made of silicone rubber which can be used in shells presently in use on automatic milking machines.

SUMMARY OF THE INVENTION

The above objectives are achieved in accordance with the present invention by forming a novel, improved inflation (also referred to as a cup liner) from at least two pieces of extruded, tubular elastomeric material, preferably extruded tubular sections of silicone rubber. Using extruded material reduces the costs of the inflations even when more expensive elastomeric material such as silicone rubber is used. One of the pieces of extruded, tubular material has a maximum cross-sectional dimension which is smaller than the maximum cross-sectional dimension of the other piece. The piece of tubular material having the larger cross-sectional dimension is also considerably longer than the piece having the smaller cross-sectional dimension. The larger piece forms the elongate, body-forming portion (hereinafter referred to as the body-forming member).

The lower end of the body-forming member forms an outlet which is adapted to be engaged by the lower end of an outer, rigid shell that fits substantially coaxially around the inflation. The outlet is also adapted to be attached to the vacuum milk line of a milking machine. The upper end of the body-forming member is expanded over the outer circumference of an expansion ring which has a diameter substantially greater than the maximum cross-sectional dimension of the unexpanded portion of the body member.

The small piece of extruded, tubular material is formed into a mouth-forming diaphragm having a central opening and positioned adjacent to the enlarged, upper end of the body-forming member. The diaphragm is formed by expanding one end of the smaller piece of tubular material (hereinafter referred to as the mouth-forming member) to at least about the inner circumference of the expansion ring, wherein it is joined to the end of the body-forming member which is expanded over the expansion ring. The other end of the tubular, mouth-forming member is deflected inwardly toward the longitudinal axis of the body-forming member so that the open end of the other end of the mouth-forming member is positioned adjacent to the enlarged, upper end of the body-forming member and is substantially coaxial with the longitudinal axis of the body-forming member. The inwardly extending lateral sides of the mouth-forming member, thus, form the diaphragm, with the open end of the mouth-forming member forming the central opening in the diaphragm.

The central opening in the diaphragm has a smaller diameter than the maximum cross-sectional dimension of the unexpanded portion of the body-forming member, and, thus, firm contact of the teat of a cow is made by the diaphragm when the teat cup containing the inflation is positioned in milking position on the teat of a cow. The contact between the teat and the diaphragm is sufficient for teats of various sizes to prevent the inflation from moving further up on the teat during the milking period as well as from falling off the teat during the latter stages of the milking period. Thus, the inflations can be used in milking a number of cows whose teats may vary in size from cow to cow. Further, the diaphragm has been found to be sufficiently flexible and pliable to essentially eliminate tissue damage to the teat by the mouth-forming diaphragm.

Additional objects and features of the invention will become apparent from the following detailed description, taken together with the accompanying drawings.

THE DRAWINGS

Particular embodiments of the present invention representing the best mode presently contemplated of carrying out the invention is illustrated in the accompanying drawings, in which.

DETAILED DESCRIPTION OF THE ILLUSTRATED EMBODIMENTS

Several preferred embodiments of inflations and their use in teat cups of automatic milking machines will be described hereinafter. In all the embodiments, the inflations are made from at least two sections or pieces of extruded, tubular, elastomeric material. The pieces of tubular material are simply cut to desired lengths from the extruded material. One of the pieces is used as the body-forming member of the inflation, and the second piece is used to make the mouth-forming diaphragm member at the end of the inflation which engages the teats of the cow. The first piece, or body-forming member, is considerably longer than the second piece which forms the mouth-forming diaphragm. Depending upon the particular teat cup assembly in which the inflation is to be used, the first piece of tubular material is cut to a length of generally between about four inches and eight inches or larger as may be desired. The second piece, i.e., the piece used to make the mouth-forming diaphragm member, is cut to a length of generally between about one-half inch to about 2 inches, depending on the particular embodiment of the inflation which is being made. The second or smaller piece also has a maximum cross-sectional dimension smaller than the maximum cross-sectional dimension of the first or larger piece. Typically, the maximum cross-sectional dimension of the first piece will be from about 0.06 inch to about 0.25 inch larger than the maximum cross-sectional dimension of the second piece.

In making the inflation, the tubular mouth-forming member is bonded to one end of the body-forming member. Preferably, the tubular members are extruded from silicone rubber which can be firmly and permanently bonded together by silicone glues or bonding agents which are commercially available. In addition, the silicone rubber inflations have much greater useful life than inflations made of rubber and other elastomeric materials. The end of the body-forming member to which the mouth-forming member is bonded is then expanded over the outer circumference of an annular expansion ring which has a diameter substantially greater than the maximum cross-sectional dimension of the body-forming member. The expanded end of the body forming member is held in an enlarged circular configuration around the expansion ring. The end of the mouth-forming member, which is bonded to the body-forming member is expanded outwardly toward the perimeter of the expansion ring, with the mouth-forming member extending inwardly toward the longitudinal axis of the body-forming member to form a diaphragm across the end of the mouth-forming member which is expanded over the expansion ring. The other end of the mouth-forming member forms a central opening in the diaphragm, wherein the central opening is substantially coaxial with the longitudinal axis of the body-forming member and has a diameter less than the maximum cross-sectional dimension of the unexpanded portion of the body-forming member.

Figures 1, 6:
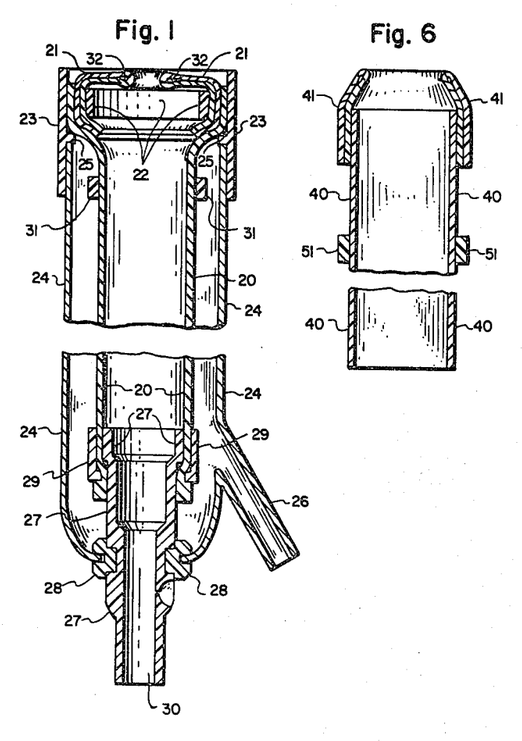
FIG. 1 is a vertical, cross-sectional view of one embodiment of an inflation and teat cup assembly in accordance with the invention.
FIG. 6 is a vertical cross-sectional view of the partially assembled inflation of FIG. 5.
Figure 2:
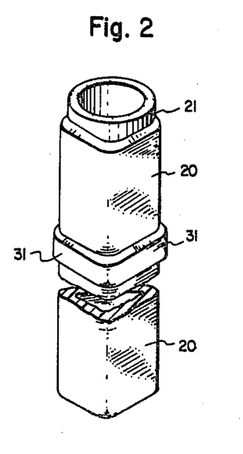
FIG. 2 is a pictorial view of the inflation of FIG. 1 in its partially assembled form.
Figure 3:
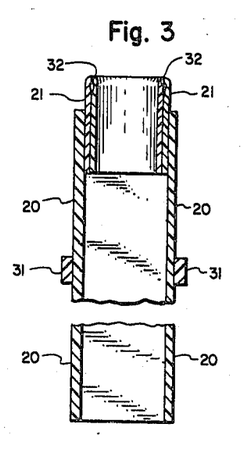
FIG. 3 is a vertical, cross-sectional view of the partially assembled inflation of FIG. 2.

One of several preferred embodiments of the present invention is illustrated in FIGS. 1-3. As shown in FIGS. 2 and 3, an elongate, tubular member 20 is bonded at its upper end to the lower end of a tubular, mouth-forming member 21. The mouth-forming member 21 is made of a length of tubular material which has been folded back over itself to form a double walled member. The cut ends of the length of tubular material forming member 21 are bonded together as the lower end of the tubular, mouth-forming member 21, with the folded edge forming the upper end of the member 21. The lower end portion of the double-walled, tubular member 21 is inserted within the upper end of the elongate, tubular member 20 and bonded thereto. The upper end of the tubular member 21 is allowed to extend slightly from the end of the member 20.

As illustrated, the tubular member 20, which forms the body-forming member of the inflation, is made of an extruded piece of material having a generally triangular cross-section, wherein the corners of the triangle are rounded and the sides of the triangular shape are equal in length. The extruded members 20 and 21 are preferably made of extruded silicone rubber. The member 21 preferably has a circular cross-sectional shape, and, although the body-forming member 20 can have a circular cross-sectional, dimension, the triangular shape as shown is preferred. The member 21, i.e., the mouth-forming member, has a maximum cross-sectional dimension smaller than the maximum cross-sectional dimension of the body-forming member 20. Typically, the body-forming member is made of extruded tubular pieces having a wall thickness of about 0.06 inch to 0.12 inch, with the triangular sides being about 0.8 inch to 1.2 inches wide. The mouth-forming member 21 is preferably made of an extruded tubular piece having a wall thickness about one-half that of the body-forming member 20, whereby, when it is folded back over itself the resulting double-walls of member 21 have a thickness substantially the same as that of the body-forming member 20. The mouth-forming member is typically formed from a tubular piece of material having an outside diameter of from about 0.68 inch to about 0.875 inch depending, of course, on the maximum cross-sectional dimension of the body-forming member 20. A particular embodiment of the inflation of this invention which has been found to be acceptable with various cows from different breeds comprises a body-forming member 20 of silicone rubber having a triangular cross-sectional shape, with the three sides of equal width of about 1 inch and having a wall thickness of about 0.08 inch, and a mouth-forming member 21 of silicone rubber having a round cross-sectional shape and formed from a tubular piece of material having a wall thickness of about 0.04 inch and an outside diameter of about 0.81 inch.

The length of the mouth-forming member 21 is typically about 0.5 inch to about 2 inches, preferably about 0.75 inch to about 1.25 inches. About 0.25 inch of the upper end of the mouth-forming member 21 extends coaxially outwardly from the end of the body-forming member 20.

As shown in FIG. 1, the upper end of the body-forming member 20 and the end portion of the mouth-forming member 21 which is attached thereto is expanded out over the outer perimeter of an expansion ring 22. The outside diameter of the expansion ring 22 is substantially greater than the cross-sectional dimension of the body-forming member 20 or the diameter of the mouth-forming member 21. The diaphragm-forming portion of the mouth-forming member 21 is deflected inwardly substantially transverse to the longitudinal axis of the liner to form a diaphragm across the open end of the body-forming member 20. The free end of the mouth-forming member forms a central opening in the diaphragm which is concentric with the axis of the body-forming member 20. The expanded upper portion of the inflation is adapted to seat firmly within the cap 23 of the teat cup assembly as shown in FIG. 1. The cap 23 is, in turn, adapted to firmly engage and seat on the upper end of the outer shell 24 of the teat cup assembly. A small annular ledge 25 can be provided on the inside of the cap 23, whereby the expanded upper portion of the inflation rests on the upper side of the ledge 25 and the upper end of the outer shell 24 engages the lower side thereof. The outer shell 24 is made of rigid synthetic resin or plastic material or of a suitable metal such as stainless steel.

A nipple 26 is formed on the lower side of the outer shell 24 and is adapted to be connected to a pulsating vacuum line. An opening is formed in the lower end of the outer shell 24. A plug member 27 is engaged in the opening so as to make a vacuum tight seal therewith. As shown, a grommet 28 formed from an elastomeric material seals the plug member 27 to the opening in the outer shell 24. The lower end of the body-forming member 20 of the inflation engages the upper end of the plug member 27, i.e., the end thereof extending into the outer shell 24. As shown, the lower end of the body-forming member 20 of the inflation fits tightly over the end of the plug member 27, and a retainer ring 29 fits around the assembly to insure retention of the end of the body-forming member 20 by the plug member 27. An elongate opening 30 extends through the plug member 27 from its lower end to its upper end, so that the opening is in flow communication with the inside of the inflation. The lower end of the plug member 27 is adapted to be connected to a constant vacuum, milking line.

A reinforcing band 31 is advantageously positioned around the outer circumference of the body-forming member 20, so as to be located anywhere between the expansion ring 22 at the upper end of the body-forming member 20 and about the midpoint between the expansion ring 22 and the lower end of the body-forming member 20. Preferably, the reinforcing band 31 is positioned between about one inch and about 2 inches below the expansion ring 22. The reinforcing band 31 is preferably made of a narrow piece or band of tubing cut from the tubular material from which the body-forming member 20 is made. The reinforcing band 31 is fitted over the body-forming member 20 and bonded thereto. The band 31 provides sufficient resiliency to restrain the upper portion of the inflation to prevent excessive expansion in the vicinity of the reinforcing band 31 to prevent excessive teat penetration. This acts in concert with the resilient opening in the mouth-forming member 21 to prevent the teat cup assembly from moving up on the teat during the milking period. As has been described in the prior art, it is not desirable to allow the teat to enter entirely into the inflation, or to allow the teat cup assembly to work its way up to and against the udder. The supple resiliency of the inflation body of the present invention results in sufficiently firm contact with the teat to essentially eliminate undesirable penetration of the teat into the inflation as well as unwanted movement of the teat cup further up on the teat. The lower end of the inflation below the reinforcing band 31 is adapted to collapse during such cycle and periodically relieve the cow's teat from the vacuum in the milking line without exerting excessive pressure or pinching on the end of the cow's teat. The pinching of the ends of the cow's teats as occurs in prior art inflations is a major cause of mastitis and other damage to the cow's teats.

The mouth-forming member 21 forms a resilient diaphragm over the open upper end of the body-forming member 20. The diaphragm has a central opening therein for reception of a cow's teat. The opening in the diaphragm is smaller than the cross-sectional dimension of the unexpanded portion of the body-forming member 20, and is, thus, adapted to make firm contact with the teat of the cow. The contact between the teat and the diaphragm is sufficient to prevent the teat cup assembly from falling off the teat during the latter stages of the milking period, and the supple resiliency of the diaphragm allows the teat cup to be used on teats of various sizes without causing damage to the teats.

As can be seen in FIGS. 1–3, a supple, hollow ring 32, having a smooth teardrop cross-sectional shape is formed at the end of the mouth-forming member 21. The ring 32 comprises the folded back portion of the tubular piece from which the member 21 is made. This resilient, hollow ring 32 has been found to be ideally adapted to engaging the teat of a cow with firm yet gentle contact between the ring 32 and the teat of the cow. The air entrapped within the ring 32 forms a pneumatic medium which equalizes the pressure around the ring and is, thus, believed to equalize the pressure exerted around the teat of the cow. The ring 32 definitely forms a smooth, supple, opening to the inflation having no sharp or ragged edges. It has further been found that when the inflation is made of silicone rubber, the opening formed by the ring 32 has far greater resistance to rips or lacerations propagating from the opening into the stretched diaphragm than openings formed with a raw edge. The raw edge of a sheet of silicone rubber has relatively little resistance to tearing, and once a laceration or tear is initiated, the silicone rubber has little resistance to propagation of the laceration or tear. Although, as will be described hereinafter, a single walled mouth-forming member can be used in the invention; but, some method of reinforcing the raw edge of the tubing which forms the central opening in the diaphragm is desirable, especially when the diaphragm is made of silicone rubber, to prevent tears from starting at the raw edge of the opening and propagating into the diaphragm. The ring 32 of the double walled mouth-forming member needs no further reinforcement.

Figure 4:
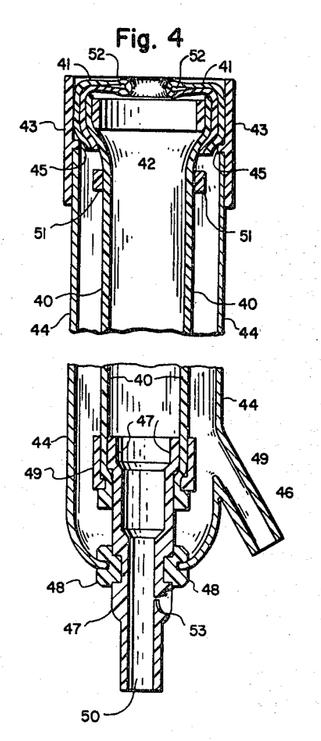
FIG. 4 is a vertical cross-sectional view of another embodiment of an inflation and teat cup assembly in accordance with the present invention.
Figure 5:
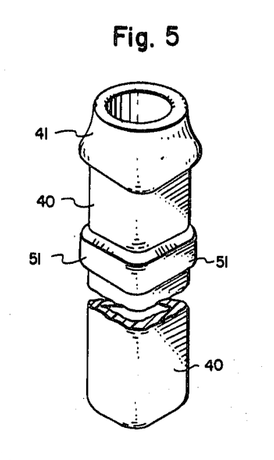
FIG. 5 is a pictorial view of the inflation of FIG. 4 in its partially assembled form.

Referring now to FIGS. 4–6 of the drawings, another embodiment of the invention is shown which also utilizes the double walled mouth-forming member of the inflation. As illustrated, the body-forming member 40 is formed from an extruded piece of tubular material which is of the same tubular material from which the body-forming member 20 of FIGS. 1–3 is made. The mouth-forming member 41 is also formed from an extruded piece of tubular material which is folded back over itself as described above with respect to the mouth-forming member of FIGS. 1–3. The tubular material from which the mouth-forming member 41 is made preferably has a wall thickness of about one-half the wall thickness of the body-forming member as mentioned hereinbefore.

In the embodiment shown in FIGS. 4–6, the lower end of the mouth-forming member 41 (the end which consists of the folded back ends of the starting tubular member which are securely bonded to each other) is expanded over and bonded securely to the upper end of the body-forming member 40.

As shown in FIG. 4, the upper end of the body-forming member 40 and the end portion of the mouth-forming member 41 which is attached thereto are expanded out over the outer perimeter of an expansion ring 42. The outside diameter of the expansion ring 42 is substantially greater than the cross-sectional dimension of the body-forming member 40 or the diameter of the mouth-forming member 41. The expanded upper portion of the inflation is adapted to seat firmly within the cap 43 of the teat cup assembly as shown in FIG. 4. The cap 43 is, in turn, adapted to firmly engage and seat on the upper end of the outer shell 44 of the teat cup assembly. A small annaular ledge 45 can be provided on the inside of the cap 43, whereby the expanded upper portion of the inflation rests on the upper side of the ledge 45 and the upper end of the outer shell 44 engages the lower side thereof. The outer shell 44 and cap 43 are made of rigid synthetic resin or plastic material or of a suitable metal such as stainless steel.

A nipple 46 is formed on the lower side of the outer shell 44 and is adapted to be connected to a pulsating vacuum line. An opening is formed in the lower end of the outer shell 44. A plug member 47 is engaged in the opening so as to make a vacuum tight seal therewith. As shown, a grommet 48 formed from an elastomeric material seals the plug member 47 to the opening in the outer shell 44. Preferably, an indented annular ring is formed in the perimeter of said plug member, and the grommet is made of an elastomeric material, whereby it is adapted to be expanded and to slide over the lower end of the plug member and into seating engagement with the annular ring. An indented annular slot is advantageously provided around the perimeter of the grommet, with the annular slot being adapted to receive the perimeter of the opening in the lower end of the shell. The lower end of the body-forming member 40 of the inflation engages the upper end of the plug member 47, i.e., the end thereof extending into the outer shell 44. As shown, the lower end of the body-forming member 40 of the inflation fits tightly over the end of the plug member 47, and a retainer ring 49 fits around the assembly to insure retention of the end of the body-forming member 40 by the plug member 47. An elongate opening 50 extends through the plug member 47 from its lower end to its upper end, so that the opening 50 is in flow communication with the inside of the inflation. The lower end of the plug member 47 is adapted to be connected to a constant vacuum, milking line. A small capillary or opening 53 can be provided, in the lower end portion of the plug 47 which opens from the opening 50 to the atmosphere. The opening 53 permits a controlled amount of air to be drawn in by the vacuum applied to the lower end of the plug 47.

Similar to the inflation of FIGS. 1–3, the embodiment shown in FIGS. 4–6 has a reinforcing band 51 advantageously positioned around the outer circumference of the body-forming member 40, so as to be located anywhere between the expansion ring 42 at the upper end of the body-forming member 40 and about the midpoint between the expansion ring 42 and the lower end of the body-forming member 40. Preferably, the reinforcing band 51 is positioned between about one inch and about two inches below the expansion ring 42. The reinforcing band 51 is in all respects the same band 31 as heretofor described, with respect to the embodiment of the inflation shown in FIGS. 1-3.

The mouth-forming member 41 forms a resilient diaphragm over the open upper end of the body-forming member 40. The diaphragm has a central opening therein for reception of a cow's teat. The opening in the diaphragm is smaller than the cross-sectional dimension of the unexpanded portion of the body-forming member 40, and is, thus, adapted to make firm contact with the teat of the cow. The opening in the diaphragm 41 is in all respects the same as the opening heretofore described with respect to the diaphragm 21 of the embodiment of the inflation shown in FIGS. 1-3, including a supple, hollow ring 52 forming the central opening in the diaphragm which is the same as the ring 32 described hereinbefore with respect to FIGS. 1-3.

Referring now to FIGS. 7-15 of the drawings, three embodiments of inflations in accordance with the invention are shown which utilize a single walled, mouth-forming member to form the diaphragm of the inflation. As illustrated, the body-forming members 70 are formed as in the embodiments described hereinbefore from extruded pieces of tubular material similar to that described above with respect to the body-forming member 20 of FIGS. 1-3. The mouth-forming members 71 are formed from extruded pieces of tubular material made of a resilient, flexible, elastomeric material such as silicone rubber. The mouth-forming members 71 preferably have a circular cross-section, and have a maximum cross-sectional dimension or diameter smaller than the maximum cross-sectional dimension of the unexpanded portions of the body-forming members 70.

Figures 7, 12:
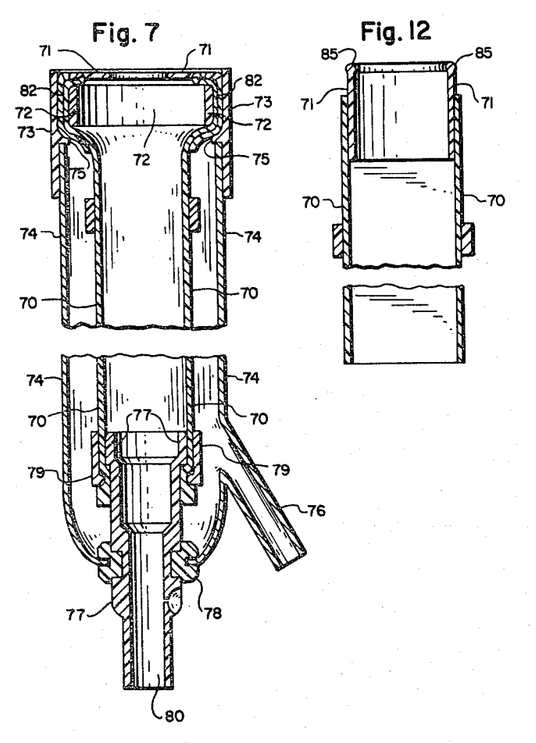
FIG. 7 is a vertical cross-sectional view of another embodiment of an inflation and teat cup assembly in accordance with the present invention.
FIG. 12 is a vertical cross-sectional view of the partially assembled inflation of FIG. 11.
Figure 8:
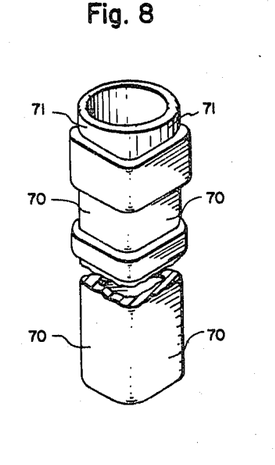
FIG. 8 is a pictorial view of the inflation of FIG. 7 in its partially assembled form.
Figure 9:
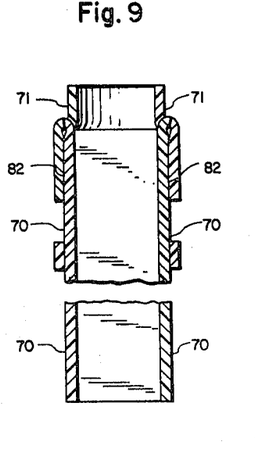
FIG. 9 is a vertical cross-sectional view of the partially assembled inflation of FIG. 8.

In the embodiment shown in FIGS. 7-9, the upper end of the body-forming member 70 is folded back over itself to form a double thickness end section 82. The lower end of the mouth-forming member 71 is bonded to the doubled back edge portion of the body-forming member 70.

Figure 10:
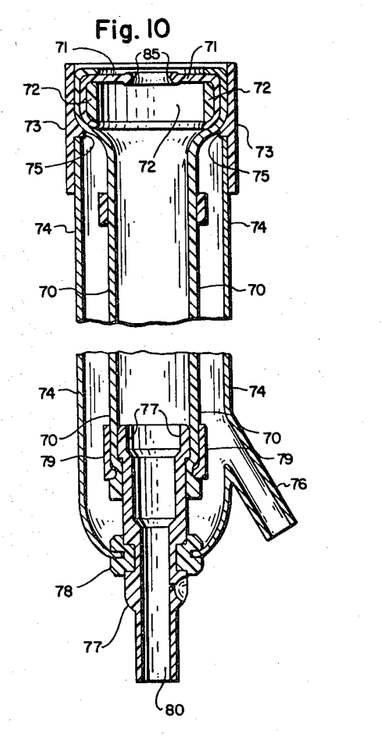
FIG. 10 is a vertical cross-sectional view of another embodiment of an inflation and teat cup assembly in accordance with the present invention.
Figure 11:
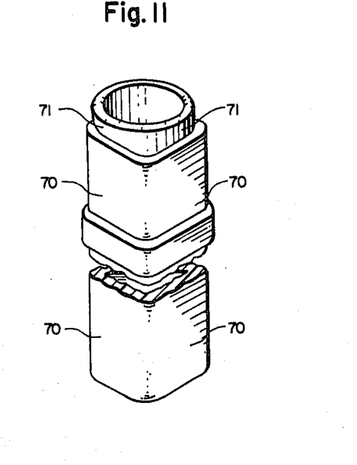
FIG. 11 is a pictorial view of the inflation of FIG. 10 in its partially assembled form.

In the embodiment shown in FIGS. 10-12, the lower end portion of the mouth-forming member 71 is fitted coaxially within the upper end portion of the body-forming member 70, with the lower end portion of the mouth-forming member 71 being firmly bonded to the upper end portion of the body-forming member 70. The upper end portion of the mouth-forming member extends from the end of the body-forming member 70 as shown.

Figure 13:
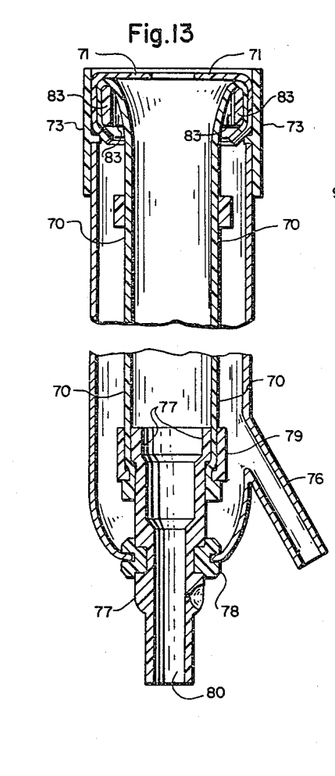
FIG. 13 is a vertical cross-sectional view of another embodiment of an inflation and teat cup assembly in accordance with the present invention.
Figure 14:
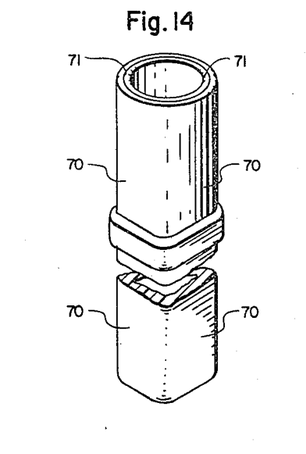
FIG. 14 is a pictorial view of the inflation of FIG. 13 in its partially assembled form.
Figure 15:
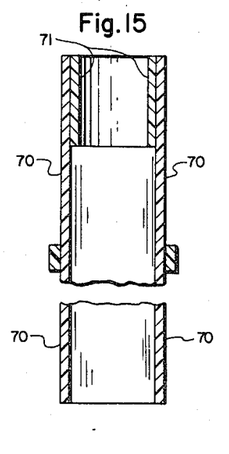
FIG. 15 is a vertical cross-sectional view of the partially assembled inflation of FIG. 14.

In the embodiment shown in FIGS. 13-15, the entire mouth-forming member 71 is fitted coaxially within the upper end portion of the body-forming member 70, with the upper end of the mouth-forming member 71 being substantially adjacent to the upper end of the body-forming member 70 and the other end of the mouth-forming member 71 extending coaxially inwardly along the inside perimeter of the body-forming member 70. The upper ends of the mouth-forming member 71 and body-forming member 70 are bonded firmly together in the upper portion.

With the two embodiments of the inflation shown in FIGS. 7-12, the upper end of the body-forming member 70 and the end portion of the mouth-forming member 71 which is attached to the body-forming member are expanded out over the perimeter of an expansion ring 72 as shown in FIGS. 7 and 10. The outside diameter of the expansion rings 72 is substantially greater than the cross-sectional dimension of the body-forming members 70 or the diameter of the mouth-forming members 71. The expanded upper portions of the inflations are adapted to seat firmly within caps 73 of the teat cup assemblies as shown in FIGS. 7 and 10. The caps 73 are, in turn, adapted to firmly engage and seat on the upper end of the outer shells 74 of the teat cup assemblies. As with the teat cup assemblies described hereinbefore, small annular ledges 75 can be provided on the inside of the caps 73, respectively, whereby the expanded upper portions of the inflations rest on the upper sides of the ledges 75, and the upper end of the outer shells 74 engages the lower sides of the ledges 75. The outer shells 74 and caps 73 are made of rigid synthetic resin or plastic material or of a suitable metal such as stainless steel.

With the embodiment of the inflation shown in FIGS. 13-15, the bonded together portions of the upper ends of the body-forming member 70 and the mouth-forming member 71 are expanded radially outwardly and folded back over the outer circumference of an annular expansion ring 83. The expansion ring 83 is similar in all respects to the expansion rings 22, 42, and 72 of FIGS. 1, 4, and 7 and 10, respectively, as described hereinbefore. In the resulting configuration as shown in FIG. 13, the upper end portion of the mouth-forming member 71 which is bonded to the upper end of the body-forming member 70 is expanded over the upper end portion of the body-forming member 70 on the expansion ring 83. The lower end portion of the mouth-forming member 71 is deflected inwardly substantially transverse to the longitudinal axis of the body-forming member 70 to form the diaphragm of the present invention. The opening at the lower end of the mouth-forming member 71 forms the central opening in the diaphragm. The expanded upper portion of the inflation of FIGS. 13-15 is adapted to seat firmly within a cap 73 and positioned within outer shells 74 as are the inflations of FIGS. 7-12.

The teat cup assemblies shown in FIGS. 7, 10, and 13 are similar to the assemblies described hereinbefore with respect to FIGS. 1 and 4. A nipple 76 is formed on the lower side of the outer shell 74 and is adapted to be connected to a pulsating vacuum line. An opening is formed in the lower end of the outer shell 74. A plug member 77 is engaged in the opening so as to make a vacuum tight seal therewith. As shown, a grommet 78 formed from an elastomeric material seals the plug member 77 to the opening in the outer shell 74. The lower end of the body-forming member 70 of the inflation engages the upper end of the plug member 77, i.e., the end thereof extending into the outer shell 74. As shown, the lower end of the body-forming member 70 of the inflation fits tightly over the end of the plug member 77, and a retainer ring 79 fits around the assembly to insure retention of the end of the body-forming member 70 by the plug member 77. An elongate opening 80 extends through the plug member 77 from its lower end to its upper end, so that the opening 80 is in flow communication with the inside of the inflation. The lower end of the plug member 77 is adapted to be connected to a constant vacuum, milking line.

The mouth-forming members 71 as shown in FIGS. 7-15 form resilient diaphragms over the open upper ends of the body-forming members 70, and have central openings therein for reception of a cow's teat. The openings in the diaphragms are smaller than the cross-sectional dimensions of the unexpanded portions of the body-forming members 70, and are adapted to make firm contact with various sized teats of cows. The central opening in the diaphragm formed in the mouth-forming members 71 achieves the same results with the same advantages as previously described with respect to the embodiment shown in FIGS. 1-3. It has been found advantageous to reinforce the raw edges of the central opening in the diaphragms made from single-walled, mouth-forming members. This is easily and readily accomplished by dipping the end of the mouth-forming member 71 which will ultimately form the central opening in the diaphragm into a liquid, polymerizable solution of an elastomeric material to build up a smooth torus as shown by reference numeral 85 (FIGS. 10 and 12). The torus 85 eliminates the sharp, raw edges on the opening which would otherwise irritate the teats of the cow. In addition, the torus 85 reinforces the raw edge of the opening in the diaphragm against cuts and tears from starting at the raw edge and propagating into the diaphgram proper. This latter function is of considerable importance when the diaphragm is made of silicone rubber. As mentioned hereinbefore, a sheet of silicone rubber has little resistance to the initiation of lacerations and tears at the raw edge of the sheet. The resistance to the initiation of such lacerations and tears is significantly increased by reinforcing the raw edge of the mouth-forming member with the torus 85. The reinforcing torus 85 is readily formed by dipping the end of the mouth-forming member 70 into a liquid, polymerizable solution of silicone rubber prior to assembly of the mouth-forming member 71 and body-forming member 70 into the inflation having one end stretched over the expansion ring.

Figure 16:
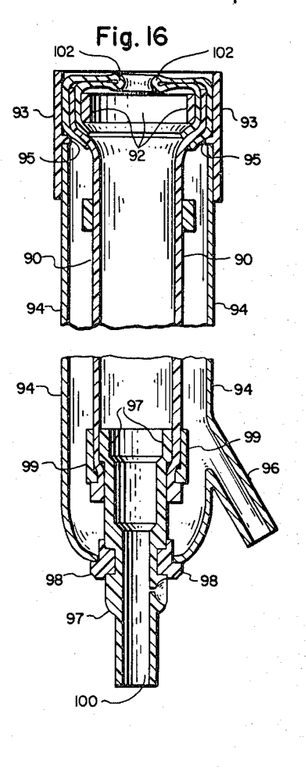
FIG. 16 is a vertical cross-sectional view of another embodiment of an inflation and teat cup assembly in accordance with the present invention.
Figure 17:
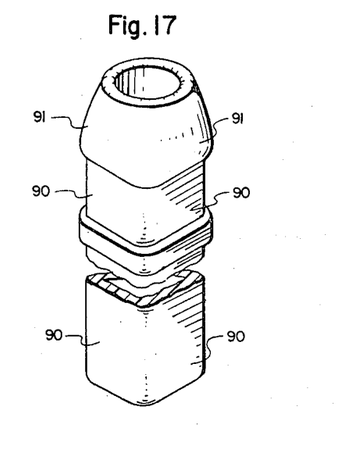
FIG. 17 is a pictorial view of the inflation of FIG. 16 in its partially assembled form.
Figure 18:
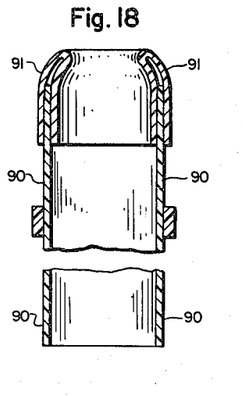
FIG. 18 is a vertical cross-sectional view of the partially assembled inflation of FIG. 17.

Another embodiment of an inflation in accordance with the invention which closely resembles the inflation of FIGS. 1-6 is illustrated in FIGS. 16-18. This embodiment utilizes a double walled mouth-forming member in forming the diaphragm at the entrance to the inflation. The body-forming member 90 is formed from an extruded piece of tubular material which is the same tubular material from which the body-forming member 20 of FIGS. 1-3 is made. The mouth-forming member 91 of FIGS. 16-18 is formed from an extruded, tubular material which is folded back over itself, with one end thereof being bonded to the inside edge portion of the upper end of the body-forming member 90 and the other end being bonded to the outside edge portion of the upper end of the body-forming member 90. The folded over end of the mouth-forming member 91 extends coaxially outwardly from the upper end of the body-forming member 90. The wall thickness of the extruded, tubular material from which the mouth-forming member 91 is made is preferably about one-half the wall thickness of the body-forming member 90, and has a maximum cross-sectional dimension somewhat smaller than the maximum cross-sectional dimension of the unexpanded portion of the body-forming member 90.

As shown in FIG. 16, the upper end of the body-forming member 90 and the end portion of the mouth-forming member 91 which is attached thereto are expanded out over the outer perimeter of an expansion ring 92. The outside diameter of the expansion ring 92 is substantially greater than the cross-sectional dimension of the body-forming member 90 or the diameter of the mouth-forming member 91. The expanded upper portion of the inflation is adapted to seat firmly within the cap 93 of the teat cap assembly as shown in FIG. 16. The cap 93 is, in turn, adapted to firmly engage and seat on the upper end of the outer shell 94 of the teat cup assembly. A small annular ledge 95 can be provided on the inside of the cap 93, whereby the expanded upper portion of the inflation rests on the upper side of the ledge 95 and the upper end of the outer shell 94 engages the lower side thereof. The outer shell 94 and cap 93 are made of rigid synthetic resin or plastic material or of a suitable metal such as stainless steel.

A nipple 96 is formed on the lower side of the outer shell 94 and is adapted to be connected to a pulsating vacuum line. An opening is formed in the lower end of the outer shell 94. A plug member 97 is engaged in the opening so as to make a vacuum tight seal therewith. As shown, a grommet 98 formed from an elastomeric material seals the plug member 97 to the opening in the outer shell 94. The lower end of the body-forming member 90 of the inflation engages the upper end of the plug member 97, i.e., the end thereof extending into the outer shell 94. As shown, the lower end of the body-forming member 90 of the inflation fits tightly over the end of the plug member 97, and a retainer ring 99 fits around the assembly to insure retention of the end of the body-forming member 90 by the plug member 97. An elongate opening 100 extends through the plug member 97 from its lower end to its upper end, so that the opening 100 is in flow communication with the inside of the inflation. The lower end of the plug member 97 is adapted to be connected to a constant vacuum, milking line.

The mouth-forming member 91 forms a resilient diaphragm over the open upper end of the body-forming member 90. The diaphragm has a central opening therein for reception of a cow's teat. The opening in the diaphragm is smaller than the cross-sectional dimension of the unexpanded portion of the body-forming member 90, and is, thus, adapted to make firm contact with the teat of the cow. The opening in the diaphragm 91 is in all respects the same as the opening heretofore described with respect to the diaphragm 21 of the embodiment of the inflation shown in FIGS. 1-3, including a supple, hollow ring 102 forming the central opening in the diaphragm which is the same as the ring 32 described hereinbefore with respect to FIGS. 1-3.

As shown in FIG. 16, the grommet 98 is formed so that the upper portion thereof is adapted to slide into the opening in the lower end of the shell 94. The lower portion of the grommet 98 has an enlarged section around the perimeter thereof so as to form a ledge circumscribing the grommet, wherein the ledge is adapted to make sealing contact with the perimeter of the opening in the lower end of the shell due to the tension provided by the inflation which is stretched somewhat in its longitudinal length between the capped upper end of the shell and the plug at the lower end of the shell.

Although several preferred embodiments of the apparatus have been illustrated and described, it is to be understood that the present disclosure is made by way of example and that various other embodiments are possible without departing from the subject matter coming within the scope of the following claims, which subject matter is regarded as the invention.

I claim:

1. A method of making an inflation for use in a teat cup assembly of an automatic milking machine, said method comprising bonding a tubular mouth-forming member made of a resilient, flexible, elastic material to one end of an elongate, tubular, body-forming member which is also made of resilient, flexible, elastic material, said mouth-forming member having a cross-sectional circumference smaller than the cross-sectional circumference of the body-forming member, and then expanding said one end of the elongate, tubular, body-forming member to which the mouth-forming member is attached over the outer circumference of an annular expansion ring which has a circumference substantially greater than the cross-sectional circumference of the elongate, tubular, body-forming member, to hold said one end of the tubular body-forming member in an enlarged circular configuration which has a circumference substantially larger than the cross-sectional circumference of the unexpanded portion of said body-forming member, and to expand the end of the mouth-forming member which is bonded to the tubular body-forming member outwardly toward the perimeter of the expansion ring, with the other end of said mouth-forming member being extended inwardly toward the longitudinal axis of said body-forming member, whereby said mouth-forming member forms a diaphragm having a central opening which has a circumference less than the cross-sectional circumference of the unexpanded portion of said elongate tubular member, with said central opening being positioned adjacent to the enlarged end of said body-forming member and substantially coaxial with the longitudinal axis of said body-forming member.

2. A method of making an inflation in accordance with claim 1, wherein the tubular mouth-forming member has a circular cross-sectional shape.

3. A method of making an inflation in accordance with claim 2, wherein the body-forming member has a generally triangular cross-sectional shape.

4. A method of making an inflation in accordance with claim 1, wherein the tubular, mouth-forming member and the tubular, body-forming member are cut to size from elongate, extruded, elastomeric conduits of the appropriate cross-sectional size.

5. A method of making an inflation in accordance with claim 1, wherein the tubular, mouth-forming member and the tubular, body-forming member are made of silicone rubber.

6. A method of making an inflation in accordance with claim 5, wherein said one end of the body-forming member is folded back over itself to form a double thickness end section thereat; one end of the mouth-forming member is bonded to the doubled back edge portion of said one end of said body-forming member; and the double thickness end section of said body-forming member is expanded over the outer circumference of said annular expansion ring.

7. A method of making an inflation in accordance with claim 5, wherein one end portion of said mouth-forming member is bonded to the inside edge portion of said one end of said body-forming member, with the other end portion of said mouth-forming member extending coaxially outwardly from said one end of said body-forming member; and said one end portion of said body-forming member and the portion of the mouth-forming member which is bonded thereto are expanded over the outer circumference of said annular expansion ring.

8. A method of making an inflation in accordance with claim 5, wherein one end portion of said mouth-forming member is bonded to the inside edge portion of said one end of said body-forming member, with the other end portion of said mouth-forming member extending coaxially inwardly along the inside perimeter of said body-forming member; and the edge portion of said one end of the body-forming member and the end of the mouth-forming member which is bonded thereto are expanded radially and folded back over the outer circumference of said annular expansion ring.

9. A method of making an inflation in accordance with claim 5, wherein one end portion of said mouth-forming member is expanded to fit over and is bonded to the edge portion of said one end of said body-forming member; and the end portion of said body-forming member and the one end of said mouth-forming member which is bonded thereto are expanded over the outer circumference of said annular expansion ring.

10. A method of making an inflation in accordance with claim 5, wherein said mouth-forming member is made of a tubular member having a wall thickness no greater than about one-half the thickness of the wall of said body-forming member; the tubular member from which the mouth-forming member is made is folded back over itself and the end portions thereof are bonded together; the bonded end portions of said mouth-forming member are bonded to the inside edge portion of said one end of said body-forming member, with the folded over end of the mouth-forming member extending coaxially outwardly from said one end of said body-forming member; and said one end portion of said body-forming member and the portion of the mouth-forming member which is bonded thereto are expanded over the outer circumference of said annular expansion ring.

11. A method of making an inflation in accordance with claim 5, wherein said mouth-forming member is made of a tubular member having a wall thickness no greater than about one-half the thickness of the wall of said body-forming member; the tubular member from which the mouth-forming member is made is folded back over itself and the end portions thereof are bonded together; the bonded end portions of said mouth-forming member are expanded to fit over and are bonded to the edge portion of said one end of said body-forming member, with the folded over end of the mouth-forming member extending coaxially outwardly from said one end portion of said body-forming member; and said one end portion of said body-forming member and the portion of the mouth-forming member which is bonded thereto are expanded over the outer circumference of said annular expansion ring.

12. A method of making an inflation in accordance with claim 5, wherein said mouth-forming member is made of a tubular member having a wall thickness no greater than about one-half the thickness of the wall of said body-forming member; the tubular member from which the mouth-forming member is made is folded back over itself and the end portions thereof are bonded together; the bonded end portions of said mouth-forming member are bonded to the inside edge portion of said one end of said body-forming member, with the folded over end of the mouth-forming member extending coaxially inwardly along the inside perimeter of said body-forming member; and the edge portion of said one end of the body-forming member and the portion of the mouth-forming member which is bonded thereto are expanded radially and folded back over the outer circumference of said annular expansion ring.

13. A method of making an inflation in accordance with claim 5, wherein said mouth-forming member is made of a tubular member having a wall thickness no greater than about one-half the thickness of the wall of said body-forming member; one end portion of the mouth-forming member is bonded to the inside edge portion of said one end of said body-forming member; the mouth-forming member is folded back over itself and the other end thereof is bonded to the outside edge portion of said one end of said body-forming member, with the folded over end of the mouth-forming member extending coaxially outwardly from said one end of said body-forming member; and said one end portion of said body-forming member and the portion of the mouth-forming member which is bonded thereto are expanded over the outer circumference of said annular expansion ring.

14. A method of making an inflation in accordance with claim 1, wherein the mouth-forming member is made of silicone rubber, and prior to expanding said one end of said body-forming member over said expansion ring, the other end of said mouth-forming member is dipped into a liquid, polymerizable solution of silicone rubber to build up a smooth torus of silicone rubber thereat.

* * * * *